United States Patent
Shakiba-Herfeh et al.

(10) Patent No.: US 10,023,179 B2
(45) Date of Patent: Jul. 17, 2018

(54) MINIMIZING ENGINE PULL-UPS AND GEAR SHIFTS IN A HYBRID VEHICLE

(71) Applicant: Ford Global Technologies, LLC, Dearborn, MI (US)

(72) Inventors: Mohammad Shakiba-Herfeh, Royal Oak, MI (US); Kukhyun Ahn, Ann Arbor, MI (US); David Richens Brigham, Ann Arbor, MI (US); Alexander T. Zaremba, Dearborn Heights, MI (US); Mark John Jennings, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 15/152,233

(22) Filed: May 11, 2016

(65) Prior Publication Data

US 2017/0327105 A1    Nov. 16, 2017

(51) Int. Cl.
*B60W 20/30* (2016.01)
*B60K 6/442* (2007.10)
(Continued)

(52) U.S. Cl.
CPC .............. *B60W 20/30* (2013.01); *B60K 6/442* (2013.01); *B60W 10/06* (2013.01); *B60W 10/11* (2013.01);
(Continued)

(58) Field of Classification Search
CPC ...... B60W 20/30; B60W 20/40; B60W 10/11; B60W 10/06; F02D 41/065;
(Continued)

(56) References Cited

U.S. PATENT DOCUMENTS 6,021,369 A * 2/2000 Kamihira ............ F02D 41/1401
                                                    700/28
6,164,400 A    12/2000 Jankovic et al.
(Continued)

OTHER PUBLICATIONS

Aishwarya Panday and Hari Om Bansal; A Review of Optimal Energy Management Strategies for Hybrid Electric Vehicle; Hindawi Publishing Corporation; International Journal of Vehicular Technology; vol. 2014, Article D 160510, 19 pages, Jun. 15, 2014.
(Continued)

*Primary Examiner* — Roger L Pang
(74) *Attorney, Agent, or Firm* — David B. Kelley; Brooks Kushman P.C.

(57) ABSTRACT

A hybrid vehicle includes powertrain components such as an engine, an automatic transmission, and a traction motor selectively coupled to the engine via a clutch and to the transmission. At least one controller is programmed to control these powertrain components. The vehicle is driven over a drive cycle that includes multiple engine starts and transmission gear shifts. An amount of fuel consumption used during these engine starts and transmissions gear shifts is stored on an on-board storage device. Subsequently, the engine is inhibited from starting and the transmission is inhibited from shifting gears based on the amount of fuel consumption associated with the engine starts and transmission gear shifts performed during the drive cycle as recalled from the storage device.

17 Claims, 4 Drawing Sheets

(51) Int. Cl.
*B60W 10/06* (2006.01)
*B60W 10/11* (2012.01)
*B60W 20/40* (2016.01)
*F02D 41/06* (2006.01)
*F16H 59/34* (2006.01)
*F16H 61/02* (2006.01)
*F02D 41/14* (2006.01)
*F02N 11/08* (2006.01)
*F02D 41/02* (2006.01)

(52) U.S. Cl.
CPC .......... *B60W 20/40* (2013.01); *F02D 41/065* (2013.01); *F02D 41/1406* (2013.01); *F02N 11/0833* (2013.01); *F16H 59/34* (2013.01); *F16H 61/0204* (2013.01); *B60Y 2200/92* (2013.01); *B60Y 2300/182* (2013.01); *B60Y 2300/192* (2013.01); *B60Y 2300/43* (2013.01); *B60Y 2300/70* (2013.01); *F02D 41/0215* (2013.01); *F02D 2200/0625* (2013.01); *Y02T 10/48* (2013.01); *Y10S 903/93* (2013.01); *Y10T 477/23* (2015.01); *Y10T 477/693* (2015.01)

(58) Field of Classification Search
CPC ............ F02D 2200/0625; F16H 59/34; Y10T 477/23; Y10T 477/693; B60Y 2300/70; B60Y 2300/192; B60Y 2300/182; B60Y 2300/43
USPC ................ 701/59, 57, 60; 73/114.52, 114.53
See application file for complete search history.

(56) References Cited

U.S. PATENT DOCUMENTS

| | | | | |
|---|---|---|---|---|
| 6,205,374 | B1* | 3/2001 | Kljima | B60G 17/016 307/10.4 |
| 6,553,301 | B1* | 4/2003 | Chhaya | B60K 6/54 701/54 |
| 7,908,911 | B2* | 3/2011 | Renner | G01F 1/8468 73/114.52 |
| 9,098,952 | B2* | 8/2015 | Jung | B60W 10/00 |
| 9,809,214 | B2* | 11/2017 | Liang | B60W 20/12 |
| 2006/0113129 | A1* | 6/2006 | Tabata | B60K 6/365 180/65.25 |
| 2011/0153141 | A1* | 6/2011 | Beechie | B60R 16/0236 701/31.4 |
| 2013/0282245 | A1* | 10/2013 | Dietzel | F16H 61/0213 701/60 |
| 2013/0325231 | A1 | 12/2013 | Park | |
| 2015/0075491 | A1* | 3/2015 | Yoo | F02M 3/08 123/339.12 |
| 2017/0247027 | A1* | 8/2017 | Nefcy | B60K 6/54 |

OTHER PUBLICATIONS

Namwook Kim, Suk Won Cha, and Huh Peng; Optimal Equivalent Fuel Consumption for Hybrid Electric Vehicles; IEEE Transactions on Control Systems Technology; vol. 20, No. 3; pp. 817-825; May 2012.

Lorenzo Serrao and Giorgio Rizzoni; Optimal Control of Power Split for a Hybrid Electric Refuse Vehicle; 2008 American Control Conference; Seattle, Washington, pp. 4498-4503; Jun. 11-13, 2008.

Kukhyun Ahn and P Y Papalambros; Engine Optimal Operation Lines for Power-Split Hybrid Electric Vehicles; Department of Mechanical Engineering, University of Michigan, Ann Arbor, Michigan; pp. 1149-1162 ; May 14, 2009.

Christian Musardo et al.; A-ECMS: An Adaptive Algorithm for Hybrid Electric Vehicle Energy Management; European Journal of Control; pp. 509-524; Dec. 2005.

Niels J. Shouten et al; Energy Management Strategies for Parallel Hybrid Vehicles Using Fuzzy Logic; Control Engineering Practice; pp. 171-177; Feb. 2003.

* cited by examiner

MINIMIZING ENGINE PULL-UPS AND GEAR SHIFTS IN A HYBRID VEHICLE

TECHNICAL FIELD

The present disclosure relates to a control strategy in a hybrid vehicle that reduces the number of engine pull-ups and transmission gear shifts for driveability while considering fuel efficiency and emissions.

BACKGROUND

Hybrid electric vehicles (HEVs) include an internal combustion engine and a traction motor to provide power to propel the vehicle. To conserve fuel, the motor can be used to drive the vehicle while the engine can be turned off. Upon an increased driver demand, a reduced state of charge in a battery, or other conditions, the engine can be restarted. Similarly, the transmission can be shifted into a gear that is best suited to efficiently deliver power, including times when the engine is both stopped and restarted. Excessive engine starting, engine stopping, and transmission gear shifting can degrade drivability of the vehicle.

SUMMARY

According to one embodiment, a vehicle includes an engine, a transmission, and a traction motor selectively coupled to the engine and to the transmission. A starter motor is selectively coupled to the engine. At least one controller is programmed to, during a driving event, perform engine starts and transmission gear shifts. Then, the at least one controller is programmed to subsequently inhibit engine starts and transmission gear shifts based on an amount of fuel consumption associated with the engine starts and transmission gear shifts performed during the driving event.

The amount of fuel consumption associated with the engine starts and transmission gear shifts can be a calculated magnitude of fuel consumed during such events.

According to another embodiment, a method of controlling a powertrain in a hybrid vehicle includes performing multiple engine starts during a first driving event. Then the method includes, during a second subsequent driving event, inhibiting engine starts based on an amount of fuel consumption associated with the engine starts performed during the first driving event.

According to another embodiment, a method of controlling a powertrain in a vehicle includes first, during a first driving event, performing multiple transmission gear shifts. Then the method includes, during a second driving event, inhibiting transmission gear shifts based on an amount of fuel consumption associated with the transmission gear shifts performed during the first driving event.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
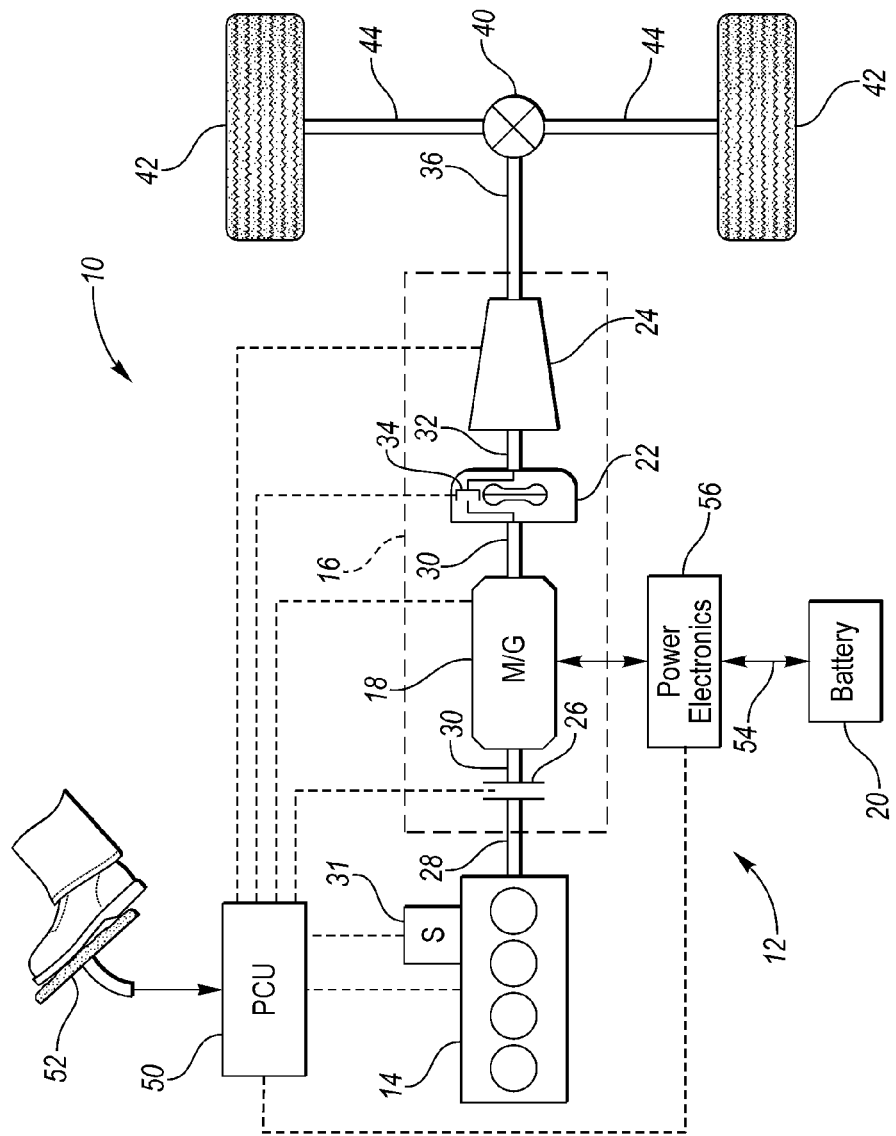
FIG. 1 illustrates a schematic of one example of a hybrid electric vehicle, showing various powertrain components that are controlled by a control system.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives an automatic transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor and the engine 14. In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56.

Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

One difference between the series arrangement shown in FIG. 1 and other HEV systems (such as a powersplit) is the increased number of discrete control variables that must be managed in order to optimize fuel and emissions together. The energy management strategy for the arrangement of FIG. 1 requires commanding the state of the torque converter, the gear number and the state of the disconnect clutch, as well as the required torque from the M/G and the engine. Once these variables are defined, the battery power and the engine operating point are consequently determined.

There is power loss in the discrete changes of the control inputs; for example, gear shifts require slipping clutches in the transmission which dissipates energy to heat through the shift. Ignoring such losses produces inaccurate estimation of fuel consumption by the energy management control system which produces non-optimal controls.

On the other hand, the theoretical approaches such as methods based on Pontryagin's minimum principle (PMP) do not consider drivability issues, such as number of engine starts ("pull-ups) and transmission gear shifting busyness. The present disclosure provides a method to optimize fuel consumption with such drivbability considerations. Engine pull-ups and gear shift busyness are implemented into the optimization method through Pontryagin's minimum principle. Penalty terms can be introduced in Hamiltonian cost functions, and can be selected to improve fuel consumption and drivability. The disclosed control strategy improves the vehicle drivability by penalizing engine pull-ups and gear shifts to avoid excessive EPUD (engine pull-up and pull-downs; engine starts and stops), shift busyness, and undesirable interaction between the gear shifts and engine starts/stops.

According to various embodiments described herein, the number of gear shifts and EPUDs are limited in order to improve drivability while still considering and improving fuel consumption and emissions. In this disclosure, an estimated amount of fuel consumption for an upcoming EPUD and/or gear shift is taken into consideration during the determination as to whether the engine should be started or stopped and whether the transmission should be shifted to another gear. In other words, the control strategy estimates the amount of fuel that would be required or lost to achieve an engine start, engine stop, or transmission shift before such action is taken. Penalty parameters are defined in the PMP control strategy to decrease the number of engine pull-ups, engine pull-downs, and gear shifts in order to achieve better drivability.

Optimization of fuel within the control system of the hybrid vehicle can be stated as the minimization of the following cost function during driving cycles from time time $t_0$ to $t_f$ in which the fuel consumption of the engine for the entire cycle is being minimized:

$$\min \int_{t_0}^{t_f} \dot{m}_f(T_e, \omega_e, P_{bat}) dt$$

where $\dot{m}_f$ is the fuel rate of the engine which depends on engine torque, $T_e$, the engine speed, $\omega_e$, and battery power, $P_{bat}$. The cost function is also subject to state of charge (SOC) limits in the battery.

The above cost function can be solved for quasi-static vehicle models with dynamics of the battery given as follows:

$$\dot{SOC}(P_{bat}) = -\frac{1}{Q_{bat}} i_{bat}(P_{bat}) = -\frac{1}{Q_{bat}} \cdot \frac{V_{OC} - \sqrt{V_{OC}^2 - 4RP_{bat}}}{2R}$$

where $i_{bat}$ is the battery current, $Q_{bat}$ is the battery's capacity, $P_{bat}$ is the battery power, $V_{OC}$ is the battery's open circuit voltage, and R is the battery internal resistance.

The Hamiltonian for the functions above with the SOC dynamics constraint can be written as:

$$\min H(t) = \dot{m}_f(T_e, \omega_e, P_{bat}) + \chi * \dot{SOC}(P_{bat}(t))$$

where $\chi$ is a coefficient representing the co-state variable to be determined by the optimization method and it characterizes the weighting between the electrical and chemical power consumption. The value of the coefficient depends on the driving cycle.

Figure 2:
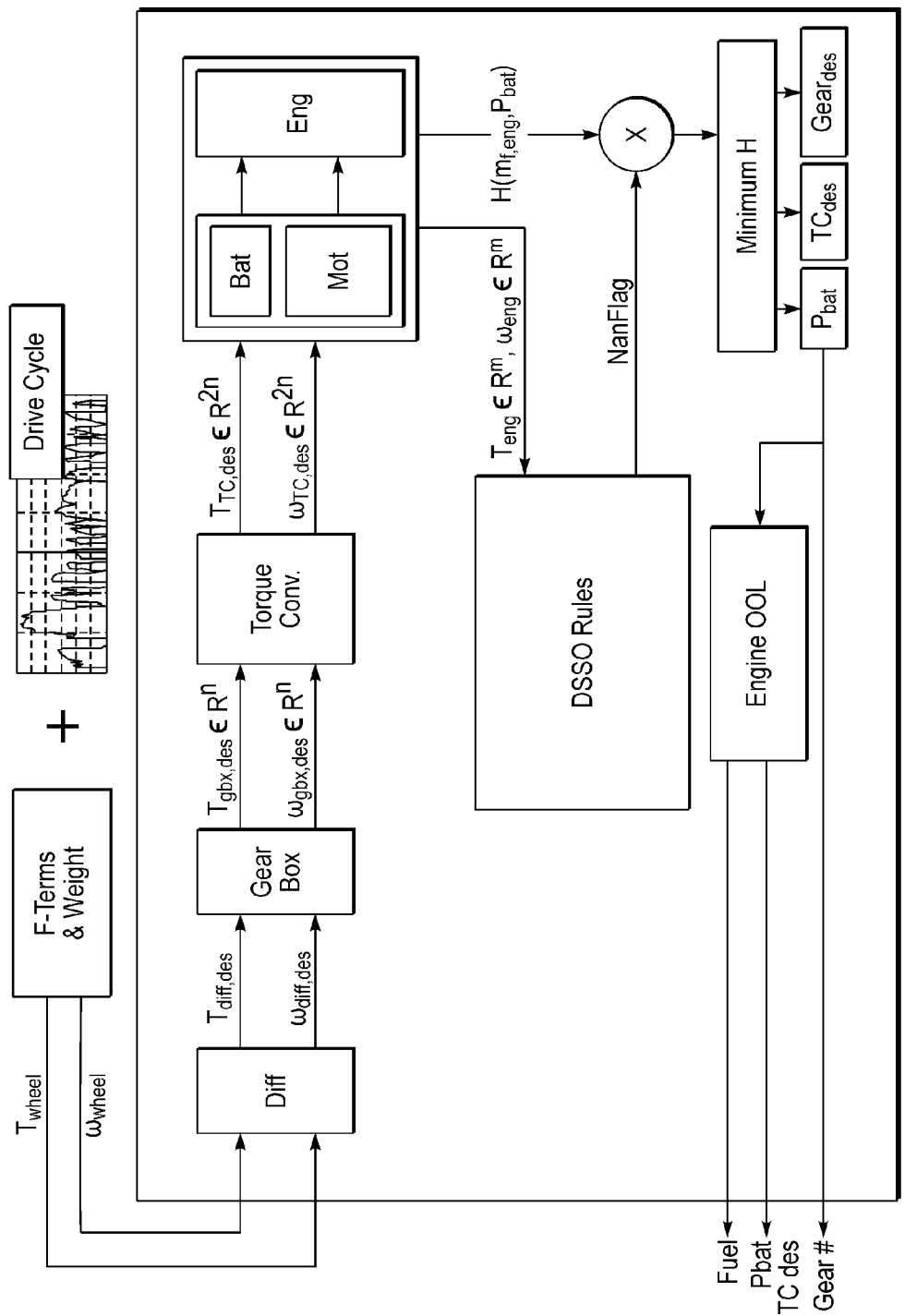
FIG. 2 illustrates a flow chart of one embodiment of an optimization process carried out by a controller in the vehicle in which vehicle conditions factor into decisions as to whether or not to start the engine, stop the engine, or shift gears in the transmission.

Drivability considerations can be considered in this control system. FIG. 2 shows a flowchart of one example of an optimization process in which, from the vehicle data and the road load, the required torque and speed of each component can be calculated for the energy management control system. Drivability considerations can be addressed in the "DSSO Rules" block in which candidates with poor drivability would be discarded from optimization. Referring to FIG. 2, n represents the number of gears in the automatic transmission, and m represents the length of the Hamiltonian and includes all possible choices of engine and M/G states that provide necessary power demand without violating the power constraints of the engine, M/G and battery. NanFlag is the output vector of DSSO block. This vector includes entries of 1 for the acceptable options and NaN (Not a Number) for the ones that result in poor drivability. By multiplying this vector by the Hamiltonian vector the entries that violate the DSSO rules would be filtered out. $T_{diff,des}$ and $\omega_{diff,des}$ represent the desired torque and speed, respectively, at the entrance of the differential. $T_{gbx,des}$ and $\omega_{gbx,des}$ represent the desired torque and speed, respectively, at the entrance of the transmission gear box. $T_{TC,des}$ and $\omega_{TC,des}$ represent the desired torque and speed, respectively, at the entrance of the torque converter, and R is the set of real numbers. The current or previous vehicle speed in the driving cycle and the vehicle's F-terms define the torque and speed at the wheel. F-terms represent the coefficients of the regression function of the aerodynamic and resistance forces on the vehicle. That is, F-terms: $\{F_0, F_1, F_2\}$ where $F_{veh} = F_0 + F_1 V_{veh} + F_2 V_{veh}^2$. The DSSO rules discard the unacceptable candidates in terms of drivability and the winner of the remainder provides the commanded engine torque, speed and battery power which defines the desired gear shift and torque converter state.

The optimization strategy described above, if implemented without constraint, can result in a high number of engine pull-ups and gear shifts, which raises drivability concerns and can cause excessive fuel consumption not accounted for in the cost function. Gear shifts and engine pull-ups require extra power that is provided directly from the engine or from the battery using energy that needs to be replaced by the engine. According to various embodiments herein, Hamiltonian function can be modified to incorporate the fuel-equivalent loss of engine pull-up and gear shift events as suggested in the following equation $$H(t) = \dot{m}_f(T_e, \omega_e, P_{bat}) + \chi * \dot{SOC}(P_{bat}(t)) +$$
$$K_{EPU}\{P_{eng}(t) > 0 \ \& \ P_{eng}(t - \delta t) = 0\} +$$
$$K_{EPD}\{P_{eng}(t) = 0 \ \& \ P_{eng}(t - \delta t) > 0\} +$$
$$K_{GS}\{abs(sign(GN(t) - GN(t - \delta t))) = 0\}$$

in which the functions abs and sign are absolute value and sign functions, respectively, GN is the gear number, and t−δt shows the previous time instance. The coefficients $K_{EPU}$, $K_{EPD}$, and $K_{GS}$ are design parameters that characterize the importance of the drivability considerations. $K_{EPU}$ is the penalty coefficient for engine pull-up, $K_{EPD}$ is the penalty coefficient for engine pull-down, and $K_{GS}$ is the penalty coefficient for a gear shift. The first and second added terms penalize engine pull-ups and pull-downs, making sure to minimize the number of EPUD and keep the duration of engine-on time more once the controller decides to use the engine. The third added term penalizes the gear shifts to account for the energy lost in shifting gears in the transmission During engine pull-up events, there is extra power consumption due to extra electric-motor power to crank up the engine and extra fuel consumption to synchronize the engine with the driveline. Similar to engine pull-ups, during the gear shift events there is power loss due to losses in gearbox clutches and torque converter slips. In both cases, the equivalent fuel consumption can be calculated based on a trip-average powertrain efficiency and the power loss due to each event from previous driving events, during the current or previous drive cycles. This data can be stored and updated on an on-board memory unit where it is recalled during future drive cycles. In another embodiment, the data is stored on an off-board memory unit via wireless signal transmission (e.g., cloud computing). This data can be used as the penalty coefficients in the modified Hamiltonian function described above.

Figure 3:
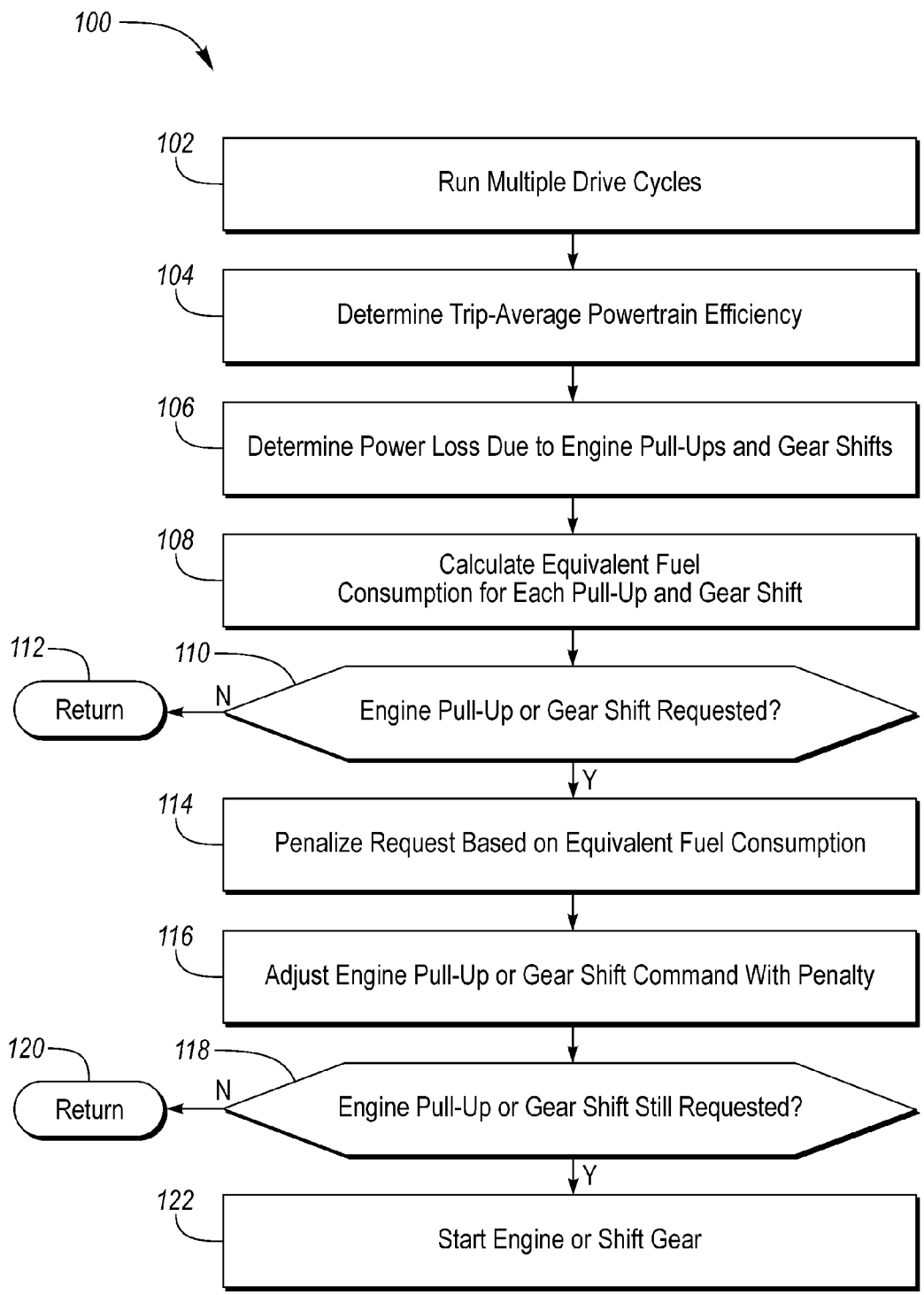
FIG. 3 illustrates a flowchart representing one embodiment of an algorithm implemented by the control system to control engine pull-ups and transmission gear shifts.

FIG. 3 illustrates a flowchart representing one embodiment of an algorithm 100 implemented by the controller to control engine pull-ups and transmission shifts based on the data stored and retrieved from previous driving, as described above. At 102, the vehicle is driven over a plurality of drive cycles. A plurality of sensors and enable data to be collected and stored. The data represents all of the driving conditions and results explained above, including power usage, fuel consumption, energy efficiencies in the engine and M/G, state of charge degradation, etc. At 104, the controller determines the trip-average overall powertrain efficiency during one or more of the drive cycles, and/or the present driving cycle. At 106, the controller determines the power loss due to the engine pull-ups and gear shifts accomplished over previous drive cycles.

The controller then calculates an equivalent fuel consumption magnitude (amount) for each engine pull-up and gear shift at 108. This magnitude represents a calculated and estimated amount of fuel used to accomplish the engine starts and gear shifts during the previous driving cycles. This data is used to determine if future engine starts or transmission shifts would consequently cause an undesirable amount of fuel consumption, as described above.

In particular, at 110, the control system continually monitors whether an engine pull-up or gear shift is requested. If not, the algorithm returns at 112. If indeed an engine pull-up or transmission gear shift is requested, the algorithm at 114 penalizes the requested based on the equivalent fuel consumption, explained above. For example, the coefficients $K_{EPU}$, $K_{EPD}$, and $K_{GS}$ are utilized design parameters for penalization. At 116, the controller adjusts the engine pull-up or gear shift command with the determined penalty factor, and again determines whether or not the engine pull-up or gear shift is still requested in view of the penalty at 118. This can be done by comparing the new command and/or penalty factor to a threshold. In a situation where the penalty is great enough to reverse the original determination of an engine pull-up or gear shift, then the algorithm returns at 120 without starting the engine or shifting gears. Thus, the penalty has inhibited the engine start and/or transmission shift. But, if the penalty is not large enough to reverse the original determination of an engine pull-up or gear shift, then such action is commanded at 122.

The penalty coefficients described above ($K_{EPU}$, $K_{EPD}$, and $K_{GS}$) can be selected to consider the equivalent fuel of the power loss to make a better fuel consumption estimation in the Hamiltonian function. This can include the power loss due to clutch slip in the gearbox 24 and torque converter 22 during a gear shift and the extra power consumed by the starter motor 31 to crank up the engine 14 as well as the extra fuel consumed by the engine 14 to be synchronized with the downstream drivetrain speed. Although this method results in less gear shifts and engine pull-ups, a more realistic power consumption estimation optimizes fuel consumption over the drive cycle.

Figure 4:
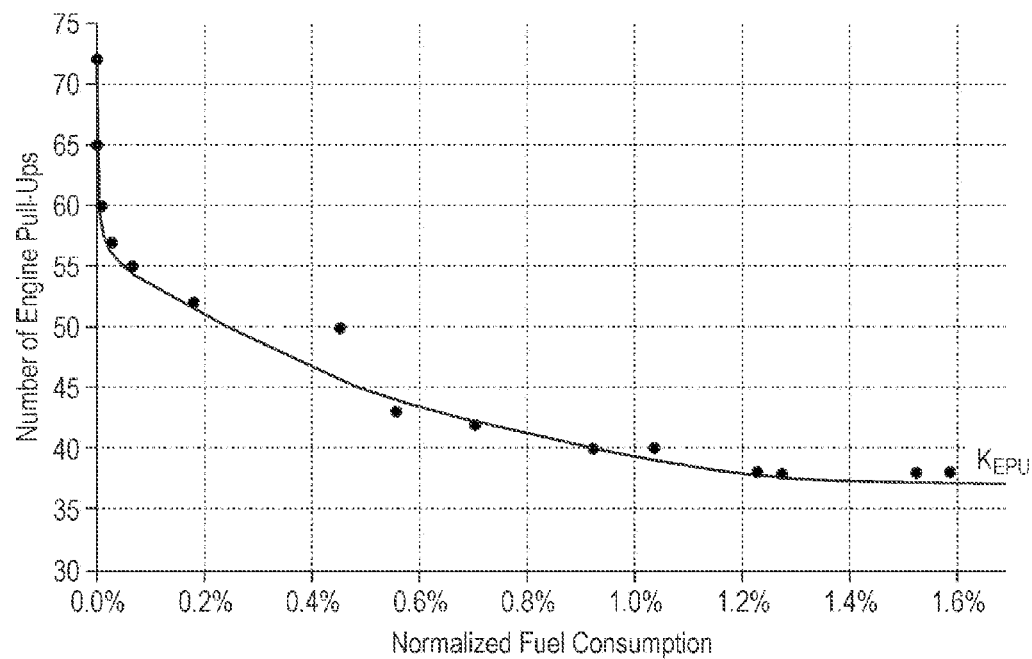
FIG. 4 illustrates a plot of normalized fuel consumption during a number of engine pull-ups over the course of several drive events while the control system of the present disclosure is carried out, according to various embodiments.
Figure 5:
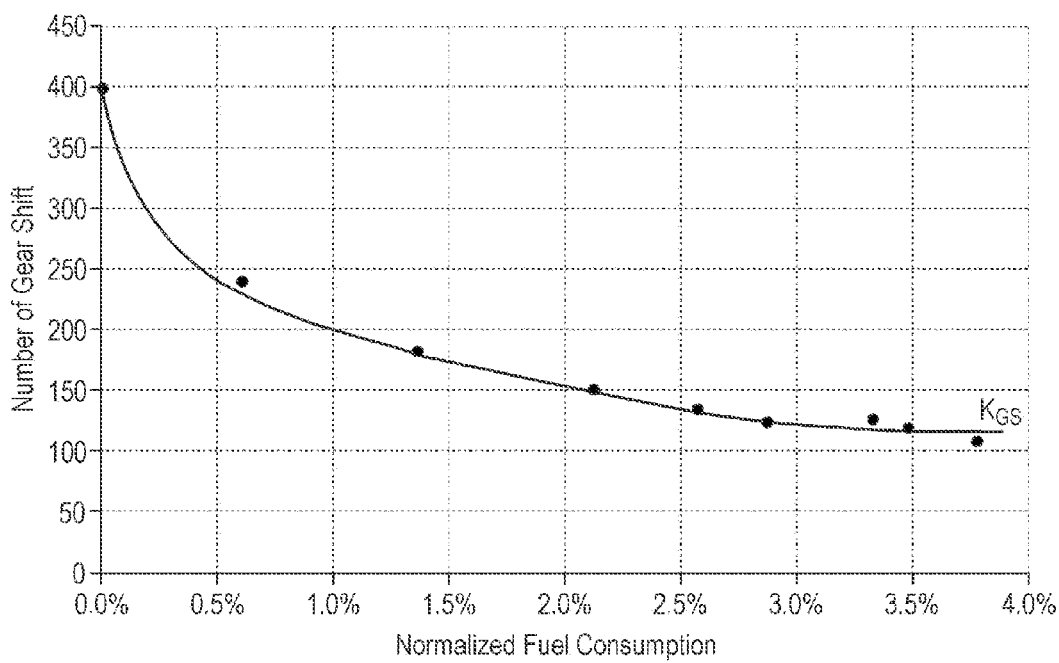
FIG. 5 illustrates a plot of normalized fuel consumption during a number of transmission gear shifts over the course of several drive events while the control system of the present disclosure is carried out, according to various embodiments.

The penalty coefficients can also be tuned to achieve the desired drivability. Increasing the penalty term will improve the drivability with the expense of lower fuel economy. A sensitivity analysis of the behavior of the controller with variation of the penalty coefficients illustrates this point. FIGS. 4 and 5 show the number of engine pull-ups and the number of gear shifts with varying magnitudes of the penalty parameters during constant driving conditions. As can be seen in the figures, the fuel consumption increases as the penalty terms increase. In FIG. 4, the number of engine pull-ups is plotted against the normalized fuel consumption for a given cycle. The penalty term $K_{EPU}$ increases from left to right. In FIG. 5, the number of gear shifts is plotted against the normalized fuel consumption for a given cycle. The penalty term $K_{GS}$ increases from left to right.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
an engine;
a transmission;
a traction motor selectively coupled to the engine and transmission;
a starter motor selectively coupled to the engine; and
at least one controller programmed to
during a driving event, perform engine starts and transmission gear shifts, and
subsequently inhibit engine starts and transmission gear shifts based on a penalizing factor representing a determined equivalent amount of fuel consumption for performing the engine starts and transmission gear shifts performed.

2. The vehicle of claim 1, wherein the at least one controller is programmed to prevent the engine from starting in response to the penalizing factor exceeding a threshold.

3. The vehicle of claim 1, wherein the at least one controller is programmed to constrain a request to shift gears in the transmission based on a penalizing factor that is based on the amount of fuel consumption.

4. The vehicle of claim 3, wherein the at least one controller is programmed to prevent the engine from starting in response to the penalizing factor exceeding a threshold.

5. The vehicle of claim 4, wherein the amount of fuel consumption associated with the engine starts and transmission gear shifts performed during the driving event is stored on an on-board storage device and recalled from the storage device to inhibit the engine from starting and the transmission from shifting gears.

6. A method of controlling a powertrain in a hybrid vehicle, comprising:
during a first driving event, performing multiple engine starts by pulling up the engine and synchronizing the engine with a driveline; and
during a second driving event, inhibiting engine starts based on a penalizing factor representing a specific amount of lost during the pulling up and synchronizing performed during the first driving event.

7. The method of claim 6, wherein the inhibiting includes preventing the engine from starting in response to the penalizing factor exceeding a threshold.

8. The method of claim 7, wherein the threshold varies based on driving conditions.

9. The method of claim 6, further comprising
during the first driving event, performing multiple transmission gear shifts; and
during the second driving event, inhibiting transmission gear shifts based on an amount of fuel consumption associated with the transmission gear shifts performed during the first driving event.

10. The method of claim 6, further comprising starting the engine based on the amount of fuel consumption being less than a threshold.

11. The method of claim 10, wherein the vehicle includes a traction motor selectively coupled to the engine and capable of providing drive torque to a transmission, and wherein the starting the engine includes turning a separate starter motor selectively coupled to the engine.

12. A method of controlling a powertrain in a vehicle, comprising:
during a first driving event, performing multiple transmission gear shifts by engaging, disengaging, and slipping clutches; and
during a second driving event, inhibiting transmission gear shifts based on a penalizing factor representing a specific amount of fuel consumption based on the engaging, disengaging, and slipping of the clutches performed during the first driving event.

13. The method of claim 12, wherein the inhibiting includes preventing the transmission from shifting gears in response to the penalizing factor exceeding a threshold.

14. The method of claim 13, wherein the threshold varies based on driving conditions.

15. The method of claim 12, further comprising
during the first driving event, performing multiple engine starts; and
during the second driving event, inhibiting engine starts based on an amount of fuel consumption associated with the engine starts performed during the first driving event.

16. The method of claim 15, wherein the vehicle includes a traction motor selectively coupled to the engine and capable of providing drive torque to a transmission, the method further comprising starting the engine based on the amount of fuel consumption associated with the engine starts being less than a threshold by turning a separate starter motor selectively coupled to the engine.

17. The method of claim 12, further comprising shifting gears in the transmission based on the amount of fuel consumption being less than a threshold.

* * * * *